United States Patent [19]

Weimert et al.

[11] 4,141,173

[45] Feb. 27, 1979

[54] FLY CATCHER

[76] Inventors: Joseph F. Weimert, Hiawatha Park, Rice Lake, Wis. 54868; Julius E. Haes, Jr., Rte. 1, Box 166, Roca, Nebr. 68430

[21] Appl. No.: 799,101

[22] Filed: May 20, 1977

[51] Int. Cl.² .................. A01M 1/04; A01M 1/06
[52] U.S. Cl. ........................................ 43/113; 43/139
[58] Field of Search ............... 43/113, 139, 138, 140, 43/112

[56] References Cited

U.S. PATENT DOCUMENTS

| | | | |
|---|---|---|---|
| D. 189,782 | 2/1961 | Richardson | 43/139 X |
| 993,644 | 5/1911 | Brisbane | 43/139 |
| 1,819,551 | 8/1931 | Gourdon | 43/113 |
| 2,931,127 | 4/1960 | Mayo | 43/139 |
| 3,058,257 | 10/1962 | Brophy | 43/139 |
| 3,123,933 | 3/1964 | Roche | 43/139 |
| 3,336,694 | 8/1967 | O'Connell | 43/113 X |

FOREIGN PATENT DOCUMENTS 422946   4/1934   United Kingdom .................. 43/113

Primary Examiner—Nicholas P. Godici
Attorney, Agent, or Firm—Merchant, Gould, Smith, Edell Welter & Schmidt

[57] ABSTRACT

A device for catching and exterminating flying insects is disclosed, which is suitable for commercial use in dairy barns, horse barns, and the like. The device includes a housing which encloses an exhaust-type fan in its lower portion, and a disposable mesh collection bag supported above the fan. The mouth of the collection bag is situated at a constriction or throat, near the top of the housing. Above this throat the housing flares outwardly and upwardly, defining an upper inlet into which insects are drawn when the fan is in operation. Means for attracting insects to the vicinity of the inlet are mounted thereabove. Continuous operation of the exhaust fan draws insects into the back and holds them there, while the large volume of air drawn through the collection bag exterminates trapped insects by dehydrating them.

6 Claims, 6 Drawing Figures

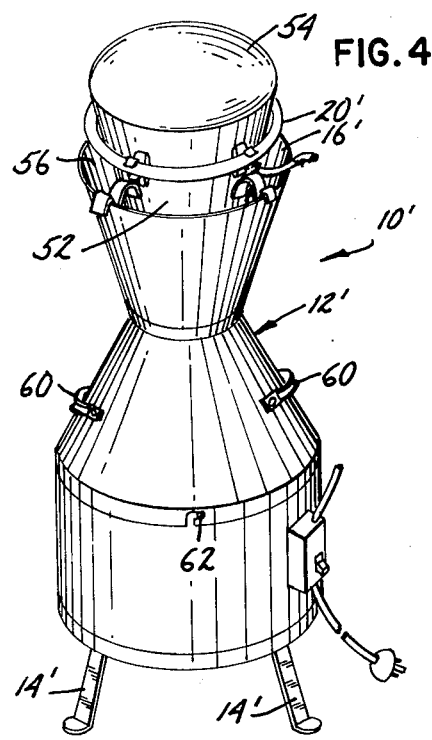
FIG. 4
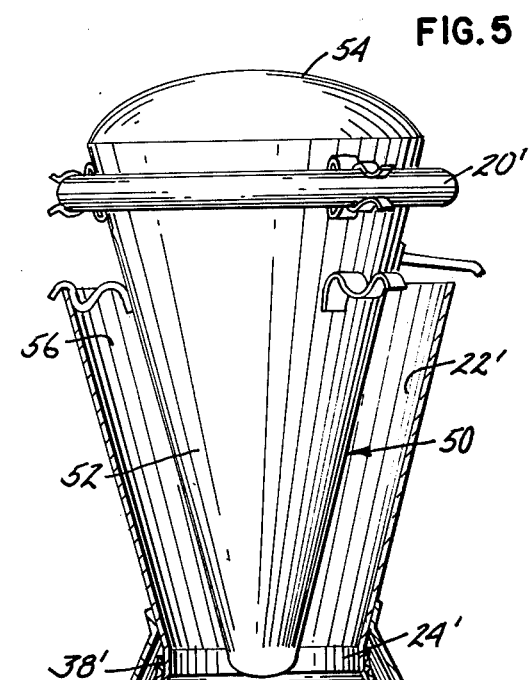
FIG. 5
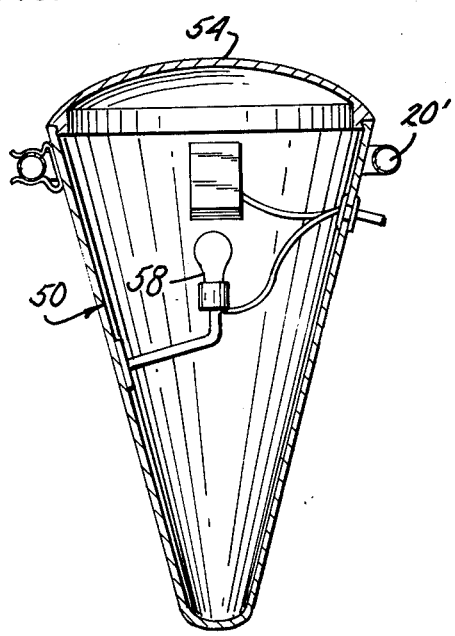
FIG. 6
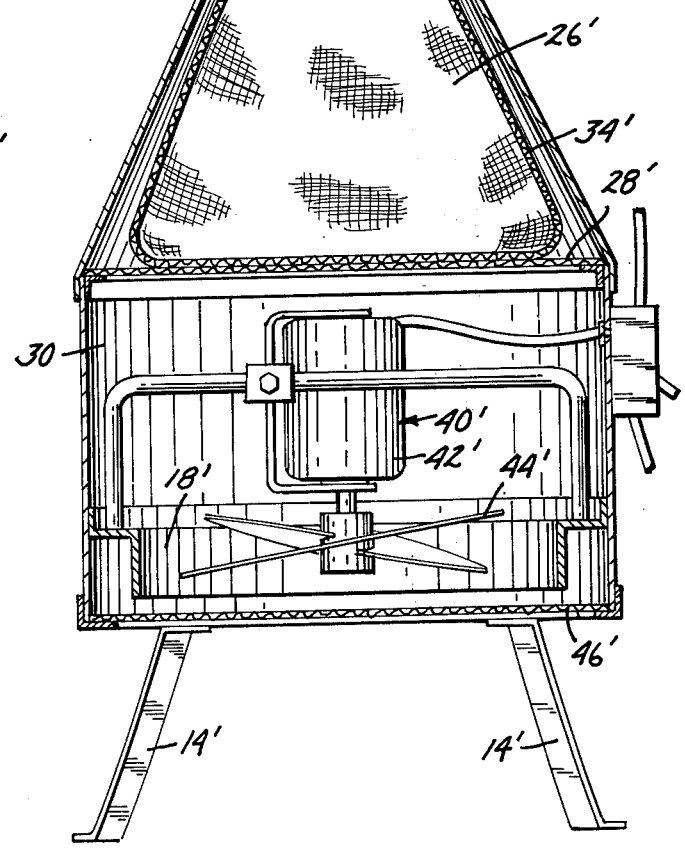

FLY CATCHER

BACKGROUND OF THE INVENTION

1. Description of the Prior Art

Many devices have been invented to attract and kill flying insects, such as mosquitos and flies. Among the common devices are those which utilize light to attract pests to extermination means. These are principally of two types: those in which a fluorescent light, or black light, is mounted in proximity to an electrified grid, and those wherein such a light source is mounted in front of a whirling fan blade. In the former case, which may incidentally use a fan to further enhance its effect, bugs drawn to the light source come into contact with the electrified grid and are electrocuted. In the latter devices, bugs drawn to the light source are drawn into the fan blade, which mashes or otherwise mutilates them before blowing them into a collection sack.

Each of these types of devices has drawbacks. Both are messy in operation: bugs impacting in the electrified grids stick there and are cooked and burned; bugs deposited in a collection sack after passing through a fan blade form a malodorous, messy, liquid residue. In addition, in the former type of device, the continuous crackling, snapping, and light flashes produced by bugs impacting on the electrified grid are extremely distracting and annoying to skittish animals, such as horses and cattle, not to mention humans.

A device which is suitable for use in large areas wherein large quantities of flies are likely to be found, such as in horse stables and dairy barns, which in operation is not distracting to animals confined in such areas, which is not messy in operation, and which is easily cleaned of exterminated insects, has not heretofore been known.

SUMMARY OF THE INVENTION

In accordance with the present invention, a fly catcher and exterminator is provided with a generally closed housing having an air inlet and an air outlet situated in the top and bottom thereof, respectively. Within the housing is mounted an exhaust fan adapted for continuous operation. Above the fan is a collection bag cavity defined by the housing walls, and a perforated floor which separates the cavity from the fan. The upper end of the bag cavity is defined by a construction, or throat, formed by the convergence of the housing walls. Above the throat, the housing walls flare to the inlet.

Mounted above the inlet is a black light for attracting insects. Within the bag cavity a disposable mesh bag is releasably supported from the throat of the housing so that all bugs drawn into the housing are caught in the collection bag.

The exhaust fan used in the present invention generates a sufficiently large airflow through the housing and collection bag that bugs caught therein are exterminated by dehydration, rather than by impacting on the fan blades or on an electric grid.

In further accordance with the present invention, an inverted, domed cone member, generally resembling an ice cream cone, may be mounted in the air inlet. The cone and dome may be reflectively coated and have an encircling black light tube mounted thereto. By mounting this member so that it extends both above the air inlet, and into the housing throat, the suction air currents are favorably channelled, and the reflective quality of the cone and dome surfaces enhance the attractive effect of the light source. Furthermore, since it is believed that heat, as well as light, attracts flying insects, the cone member may be provided with an internal heating element as a further attraction.

It will be appreciated from the foregoing that a device is provided wherein large quantities of flies may be trapped and exterminated without mess, or distraction to livestock or people. The only noise involved is the steady hum of the continuously operating fan.

The housing serves to protect and support an easily removable sack in which dehydrated bugs are deposited. By removing, disposing of, and replacing the sack with a new one, the machine is easily emptied of dead bugs, cleaned, and ready for more use.

BRIEF DESCRIPTION OF THE DRAWINGS

FIG. 4 is a view in perspective of a second embodiment of the present invention;

FIG. 5 is an enlarged sectional view taken generally along the line 5—5 of FIG. 4; and FIG. 6 is a sectional view of a portion of FIG. 5.

DETAILED DESCRIPTION OF THE PREFERRED EMBODIMENT

Figure 1:
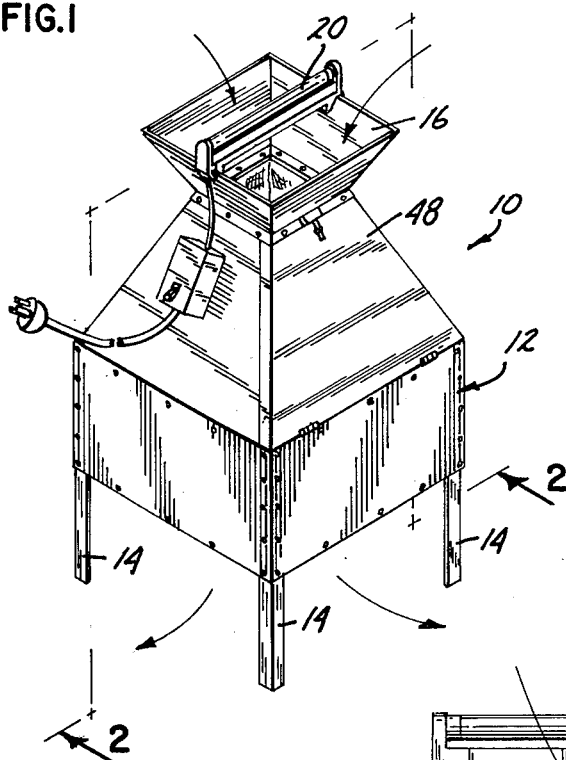
FIG. 1 is a view in perspective of the present invention.
Figure 3:
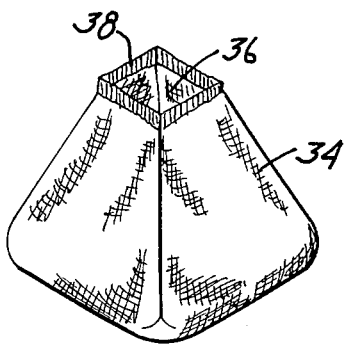
FIG. 3 is a view in perspective of the collection sack of the present invention.

Referring now to FIG. 1, there is disclosed a device 10 for capturing and exterminating flying insects. Device 10 includes a housing 12 mounted atop four legs 14. Housing 12 has an upper, inlet opening 16 and a lower, exhaust outlet 18, which is more clearly shown in FIG. 2. Mounted above inlet 16, in close proximity thereto, is a black light 20.

Figure 2:
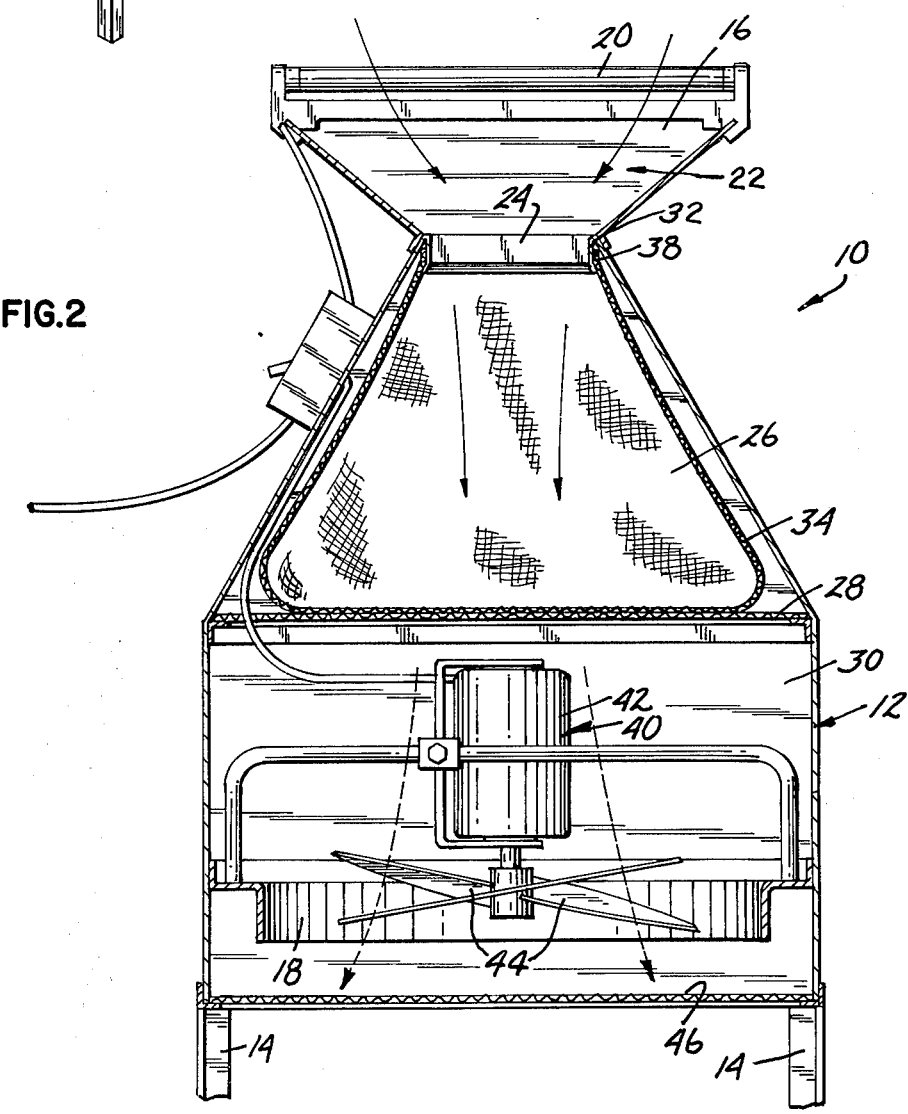
FIG. 2 is an enlarged sectional view taken generally along the line 2—2 of FIG. 1.

Referring now to FIG. 2, it can be seen that housing 12 is divided into three general sections. The first of these is a funnel portion 22, which is formed by the walls of housing 12 flaring upwardly and outwardly from a constricted throat portion 24 to inlet 16. Below throat 24, the housing walls diverge, defining a bag enclosing portion 26. The lower end of bag enclosing portion 26 is defined by a mesh floor 28 which extends horizontally across the inside of housing 12. Below floor 28 is the fan-enclosing portion 30 of housing 12.

As is shown in FIG. 2, a downwardly extending flange 32 is formed at throat 24. Flange 32 encircles throat 24.

A disposable collection sack 34, constructed of nylon mesh, mosquito netting, or some similar material, is positioned within housing 12 so as to generally fill cavity 26. Collection sack 34 has a mouth 36 which fits over downwardly extending flange 32. Means for drawing mouth 36 tight around flange 32 are provided, such as elastic band 38, which is stitched into the mouth 36 of sack 34.

Mounted in the lower portion of housing 12 is an exhaust-type fan unit 40. Fan unit 40 includes a motor 42 adapted for continuous operation, and a set of fan blades 44. Below fan blades 44 a protective mesh grid 46 extends across housing outlet 18.

A hinged door 48, shown in FIG. 1, provides access to bag enclosing cavity 26, in order to permit removal and replacement of collection bags 34.

Referring now to FIGS. 4, 5 and 6, there is shown a second embodiment of the present invention. As is shown, in this embodiment, housing 12' is generally circular in cross-section over its entire length. Extending downwardly into funnel portion 22' is a domed, inverted cone member 50. Member 50 includes an inverted conical portion 52, which extends from above inlet 16' downwardly into throat 24'. Above inverted conical portion 52 is a domed portion 54. The outer surfaces of portions 52 and 54 are reflectively coated. A circular black light tube 20' encircles member 50 above inlet 16'.

The reflective coating on the surfaces of member 50 enhances the effect of black light ring 20'. In addition, the presence of member 50 within funnel portion 22' creates an annular entry port 56 through which the suction generated by fan unit 40 is quite strong, and emanates out several feet from black light 20'.

As is more clearly shown in FIG. 6, dome member 50 is interiorly provided with means for increasing its temperature slightly. In the preferred embodiment, a simple incandescent light bulb 58 mounted within dome 50 is sufficient to heat the member. It has been found that flies and other flying insects are attracted not only by light sources, but also by warmth. Therefore, the combination of a light source 20' with the warm member 50 provides a double attractant to the pests.

The device is designed to exterminate captured flies by dehydration. To this end, fan unit 24 must draw a continuously large volume of air through collection sack 34. While we do not know the exact lower limits of the quantities of air which must be drawn through the housing, in the preferred embodiment fan motor 42 is a one-quarter horsepower motor, which operates at 1725 revolutions per minute, and fan blades 44 have a diameter of approximately 18 inches. The fan unit 40 draws approximately 2400 cubic feet of air per minute through housing 12. In the preferred embodiment, housing 12 also has the following dimensions: the area of inlet 16 is approximately 100 square inches, the area of throat 24 is approximately 25 square inches, and the cross-sectional area of housing 12 at floor 28 is approximately 400 square inches.

In operation, unit 10 is placed within a dairy barn or livery stable, or other environment in which large numbers of flies and other flying insects are found. Fan unit 40 is switched on, as are the various light sources and heat sources, depending upon which embodiment is utilized. Insects are attracted to the vicinity of mouth 16 and once within several feet of the inlet are sucked down through inlet 16, throat 24, and into collection sack 34. The high volume of air flow through sack 34 rapidly dehydrates pests held therein, thus exterminating them. Access to collection sack 34 for replacement thereof is easily gained by a hinged door 48 in the embodiment shown in FIGS. 1 and 2, or via handles 60 and bayonet closures 62, which permit lifting the upper portion of housing 12 away from the fan motor unit in the embodiment shown in FIGS. 4, 5 and 6.

As well as acting to exterminate flying insects, the steady, high volume air flow generated by fan unit 40 serves to circulate air within the confined barns, in which the device is intended to be used.

It will be appreciated from the foregoing that we have disclosed an effective device for capturing and killing large quantities of flies, which is simple in operation, and is easily cleaned. Furthermore, the device does not provide a distraction to skittish animals who may be stabled in the vicinity of the device's operation.

What is claimed is:

1. A device for capturing and exterminating flies, which comprises:
   (a) a housing including an upper, flared, portion defining an inlet and constricted throat, and a lower portion defining a collection bag cavity above a fan enclosure, said housing having an exhaust outlet at its lower end;
   (b) a disposable collection bag releasably mounted within said bag-enclosing cavity, said bag extending downwardly from the throat;
   (c) an exhaust fan mounted within said fan enclosure, said fan being adapted to draw a steady stream of air downwardly through said inlet, throat and collection bag at a rate of approximately 2,400 cubic feet per minute to exterminate bugs captured in the collection bag by dehydration; and
   (d) means, including heating means, mounted above said inlet for attracting flies to the vicinity of the inlet.

2. The device for capturing and exterminating flying insects, comprising:
   (a) a generally closed housing having an open upper end defining a circular inlet opening, and an open lower end defining a circular outlet opening, said housing having a generally circular cross section over its length and including
      (i) a funnel portion having walls tapering from said inlet opening to define a constricted throat portion,
      (ii) a bag-enclosing portion converging below said throat, and
      (iii) a fan-enclosing portion extending downwardly from said bag-enclosing portion to said outlet opening;
   (b) a dome member mounted in said inlet opening including
      (i) walls defining an inverted cone extending from the inlet to the throat of the housing, whereby an annular inlet port is defined by the walls of said cone and the walls of said funnel portion, and
      (ii) a dome portion topping the inverted cone portion;
   (c) means mounted inside the cone member for heating the cone member;
   (d) a circular black light tube encircling the cone member above the inlet opening;
   (e) a foramenous floor mounted within said housing so as to partition the fan-enclosing portion of the housing from the bag-enclosing portion thereof;
   (f) an annular flange extending around said throat and downwardly therefrom inside the housing;
   (g) a disposable, perforated collection bag, including a mouth with means thereon for releasably engaging said annular flange, supported within the bag-enclosing portion of the housing on said floor; and
   (h) an exhaust fan mounted within the fan-enclosing portion of the housing adjacent the outlet opening, said fan being adapted to draw a steady flow of air through said housing and said collection bag.

3. The device of claim 2 wherein said cone member is reflectively coated.

4. The device of claim 3 wherein a bag-enclosing cavity is defined within the housing by the housing throat, the foramenous floor, and the bag-enclosing wall, and wherein the collection bag substantially fills said cavity.

5. A device for capturing and exterminating flying insects comprising:
   (a) a generally closed housing including
      (i) an upper funnel portion having walls defining an upper inlet, said walls extending downwardly from said inlet and converging so as to define a constricted throat portion,
      (ii) a bag-enclosing portion having walls extending downwardly from said throat and diverging so as to define an enlarged cavity within the housing,
      (iii) a fan-enclosing portion having walls extending downwardly from the walls of said bag-enclosing portion and defining a lower exhaust outlet;
   (b) a mesh floor partitioning the bag-enclosing portion from the fan-enclosing portion;
   (c) a reflectively coated, domed inverted cone member mounted in the funnel portion of the housing, said member having an inverted conical portion extending from above the housing inlet downwardly into the housing throat, and a dome portion above said inverted coned portion;
   (d) a circular light source mounted so as to encircle the cone member at a point above the housing inlet;
   (e) an exhaust fan mounted within the fan-enclosing portion of the housing so as to draw air downwardly through the housing when energized;
   (f) a detachable collection bag situated in the cavity defined by walls of the bag-enclosing portion of the housing, said bag having a mouth releasably secured to the throat portion of the housing and being supported on the mesh floor;
   (g) means on said housing for providing access to the collection bag;
   (h) means mounted within the inverted cone member for heating said member.

6. The device of claim 5 wherein the fan draws at least approximately 2,400 cubic feet of air per minute through the housing.

* * * * *